Patented Mar. 4, 1930

1,749,681

UNITED STATES PATENT OFFICE

HERMANN WAGNER, OF BAD-SODEN-ON-THE-TAUNUS, GERMANY, ASSIGNOR TO GENERAL ANILINE WORKS, INC., OF NEW YORK, N. Y., A CORPORATION OF DELAWARE

AZO DYESTUFFS AND PROCESS OF MAKING SAME

No Drawing. Original application filed February 12, 1923, Serial No. 618,710, and in Germany February 24, 1922. Divided and this application filed December 23, 1925. Serial No. 77,390.

In further developing the inventive idea set forth in U. S. Patent Nr. 1.493.577 of June 30, 1922 according to which by combining certain halogen-substituted diazo-compounds with a halogen substituted toluidide dyestuffs are obtained of particularly great fastness, above all of a particularly striking fastness to kier-boiling and to light, I have found that dyestuffs of equally excellent fastness, particularly a striking fastness to kier-boiling, are produced by the combination of any diazo-compound with an arylamide of the 2.3-hydroxynaphthoic acid, halogenated in the aryl residue and substituted by an alkyl-or alkyl-oxy group in the para-position of the imino group.

I have furthermore found that azo-dyes of equally good fastness are obtained by coupling halogenated diazo-components containing an alkyl-or alkyloxy-group with arylamides of the 2.3-hydroxynaphthoic acid not halogenated in the aryl residue, but containing in the para position to the imino group an alkyl- or alkyloxy group.

The preparation of the dyestuffs may be effected in solution which gives pigment-dyestuffs; the coupling may however, also be carried out on the fibre in printing as well as in piece- and yarn dyeing.

Examples

1. The material is padded with a solution of 22,3 gr. 2.3 hydroxynaphthoic acid-p-anisidide
60 ccm. caustic soda solution 22° Bé.
20 gr. para soap PN (i. e., the ammonium salt of sulfonated ricinoleic acid)

Made up to 1 litre.

It is then dried and printed with the following colour;

14,1 gr. 4-chloro-2-toluidine are dissolved with
30 ccm. hydrochloric acid 22° Bé. and
200 ccm. hot water, cool well by adding
150 gr. ice. Thereupon add while well stirring
7,2 gr. sodium nitrite dissolved in
50 ccm. water and make up with water to
500 gr.

This diazo solution is thickened with 480 gr. tragacanth 60:1000 (i. e., a solution of 60 parts by weight of tragacanth in 1000 parts by weight of water) and there are added before use
20 gr. sodium acetate cryst.

—1 kg.

Thus a bright red tint of very good properties as to fastness is obtained.

The dyestuff has the following structural formula:

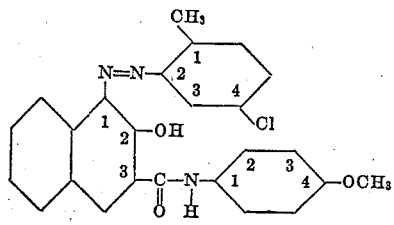

2. The material is padded with a solution of:

21 gr. 2.3-hydroxynaphthoic acid - p - toluidide
60 ccm. caustic soda solution 22° Bé.
20 gr. para soap PN Made up to 1 litre It is then dried and printed with the following colour:

14,1 gr. 5-chloro-2-toluidine are dissolved with
30 ccm. hydrochloric acid 22° Bé. and
200 ccm. hot water, cool well by adding
150 gr. ice. Then add while well stirring
7,2 gr. sodium nitrite dissolved in
50 ccm. water and make up with water to 500 gr.

This diazo-solution is thickened with
480 gr. tragacanth 60:1000 and there are added before use
20 gr. sodium acetate cryst.

1 kg.

Thus a pure scarlet tint of excellent properties as to fastness is obtained.
The dyestuff has the following structural formula:

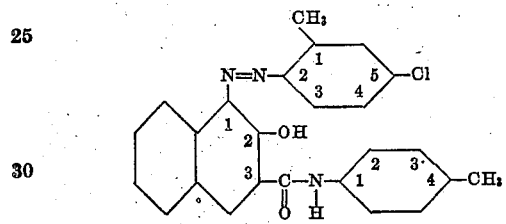

3. The diazo-solution obtained in the usual manner from 14,1 gr. of 5-chloro-2-toluidine is run, while stirring, into an aqueous suspension of 33 gr. of 2.3 hydroxynaphthoic acid-p-anisidide prepared by dissolving it in caustic soda solution and precipitating with aid of acetic acid.—The dyestuff precipitates as bluish-red flakes, and is then filtered off, washed and dried.
The dyestuff has the structural formula:

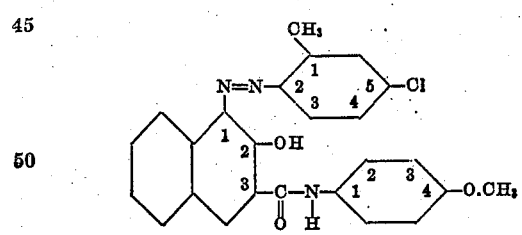

4. The material is padded with a solution of:

22,3 gr. 2.3 hydroxynaphthoic acid-p-anisidide in
60 ccm. caustic soda solution
20 gr. para soap PN
—
Made up to 1 litre It is then dried and printed with the following colour:

15,7 gr. 4-chloro-2-anisidine are dissolved in
30 ccm. hydrochloric acid 22° Bé. and
200 ccm. hot water, cool by adding
150 gr. ice. Add while stirring a solution of
7,2 gr. sodium nitrite dissolved in
50 ccm. water and make up to 500 gr.

This diazo-solution is thickened with
480 gr. tragacanth 60:1000 and there are added before use
20 gr. sodium acetate cryst.

1 kg.

Thus a red tint with a yellow hue of very good properties as to fastness is obtained.
The dyestuff has the structural formula:

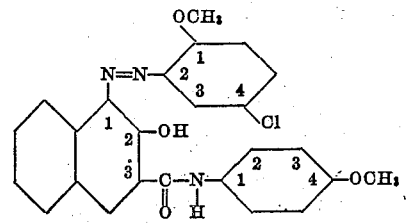

5. The material is padded with a solution of:

21 gr. 2.3-hydroxynaphthoic acid-p-toluidide in
60 ccm. caustic soda solution 22° Bé.
20 gr. para soap PN
—
Made up to 1 litre.

The dried material is printed with the following colour:

15,7 gr. 4-chloro-2-anisidine are dissolved in
30 ccm. hydrochloric acid 22° Bé. and
200 ccm. hot water, cool by adding
150 gr. ice. There is then added while stirring a solution of
7,2 gr. sodium nitrite dissolved in
50 ccm. water and the whole is made up with water to 500 gr.

This diazo-solution is thickened with
480 gr. tragacanth 60:1000 and there are added before use
20 gr. sodium acetate.

1 kg.

Thus a red tint with a blue hue of excellent properties as to fastness is obtained.

The dyestuff has the structural formula:

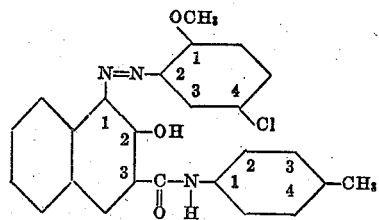

6. The diazo-solution obtained from 15,7 gr. 4-chloro-2-anisidine is run into an aqueous suspension of 28 gr. 2.3 hydroxynaphthoic acid-4-toluidide, prepared by dissolving it in caustic soda solution and precipitating with diluted acetic acid. The azo-dyestuff precipitates in red flakes. It is filtered off, washed and dried.

The dyestuff has the structural formula:

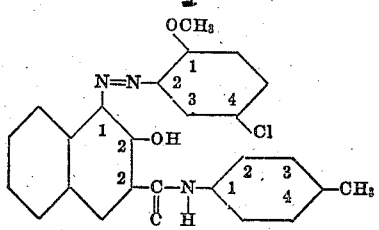

7. The material is padded with a solution of:

22,3 gr. 2.3 hydroxynaphthoic acid-4-anisidide.
60 ccm. caustic soda solution 22° Bé.
20 gr. para soap PN Made up to 1 litre.

It is then dried and printed with the following colour:

17,2 gr. 4-chloro-2-phenetidine
150 ccm. water
24 ccm. hydrochloric acid 22° Bé. mix well to a paste then cool with
150 gr. ice, add
8 gr. sodium nitrite dissolved in
50 ccm. water thickened with
540 gr. tragacanth 60:1000 and add before use
20 gr. sodium phosphate and make up with water to 1 kg.

The dyestuff has the structural formula:

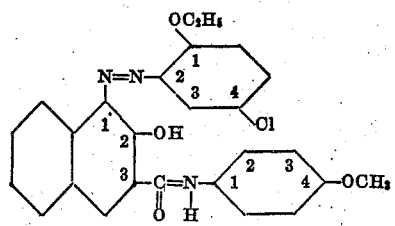

8. The yarn is impregnated with the following preparation:

10,55 gr. 2.3 hydroxynaphthoic acid-4-toluidide
20 ccm. caustic soda solution 34° Bé.
30 ccm. sodium Turkey red oil 50%
500 ccm. hot water. Then make up with water to 1 litre.

The impregnated yarn is wrung out and dyed with the following diazo solution:

3,44 gr. 4-chloro-2-phenetidine are mixed to a paste with
5,2 ccm. hydrochloric acid 22° Bé. and
10 ccm. water, cool by adding
25 gr. ice, add while stirring
1,44 gr. sodium nitrite in
5,76 ccm. water and make up with water to 1 litre then add before use
4 gr. sodium acetate.

The dyestuff has the structural formula:

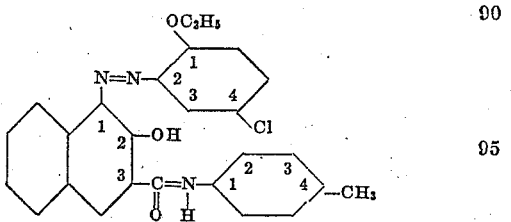

After dyeing the material is well washed and soaped. This application is a division of our application Ser. Nr. 618,710 of 12th February, 1923.

We claim:

1. As new products azo-dyestuffs of the following constitution:

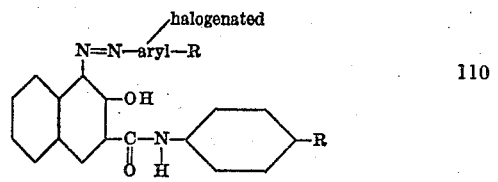

wherein R designates an alkyl or alkyloxy group.

2. As new products, the azo-dyestuffs of the following constitution:

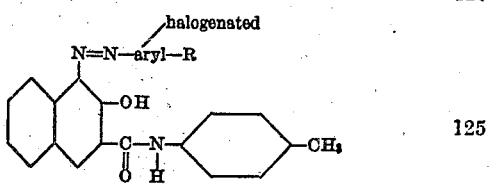

wherein R designates an alkyl- or alkyloxy group.

3. As new products, the azo-dyestuffs of the following constitution:
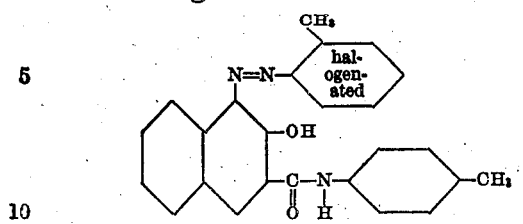
4. As a new product the azo-dyestuff of the following constitution:
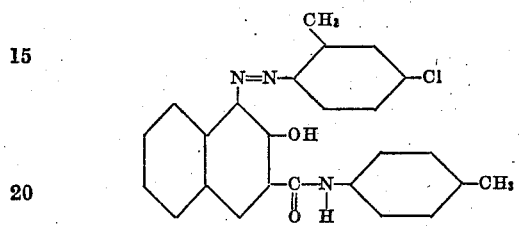
5. Material dyed with the dyestuffs of claim 1.
6. Material dyed with the dyestuffs of claim 2.
7. Material dyed with the dyestuffs of claim 3.
8. Material dyed with the dyestuff of claim 4.
In testimony whereof, I affix my signature.
HERMANN WAGNER.